July 30, 1929.  T. DE LA MARE  1,722,369
NONCORRODIBLE COMPOSITE PIPE
Filed Feb. 20, 1928  2 Sheets-Sheet 1
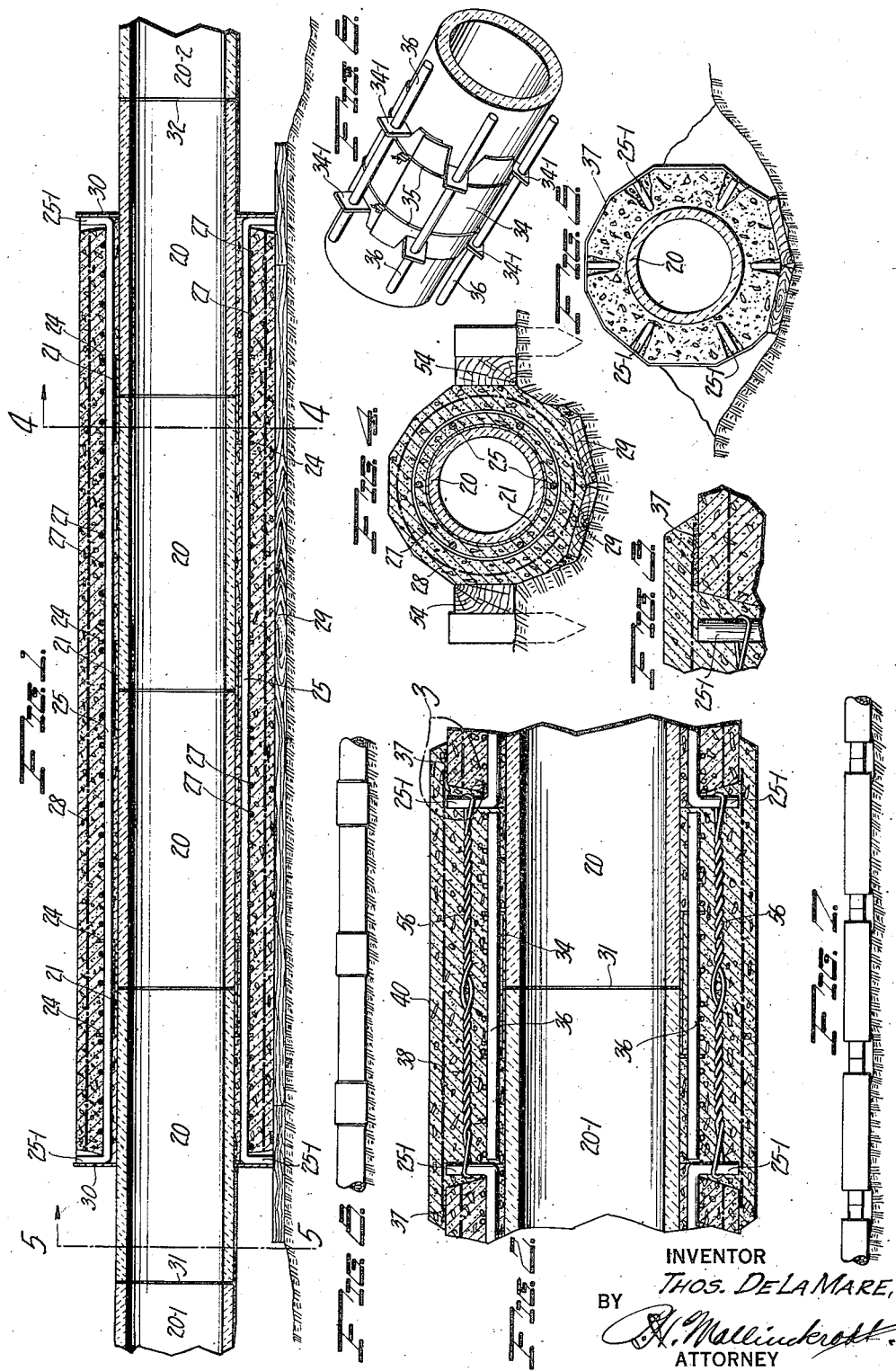
INVENTOR
THOS. DE LA MARE,
BY
ATTORNEY

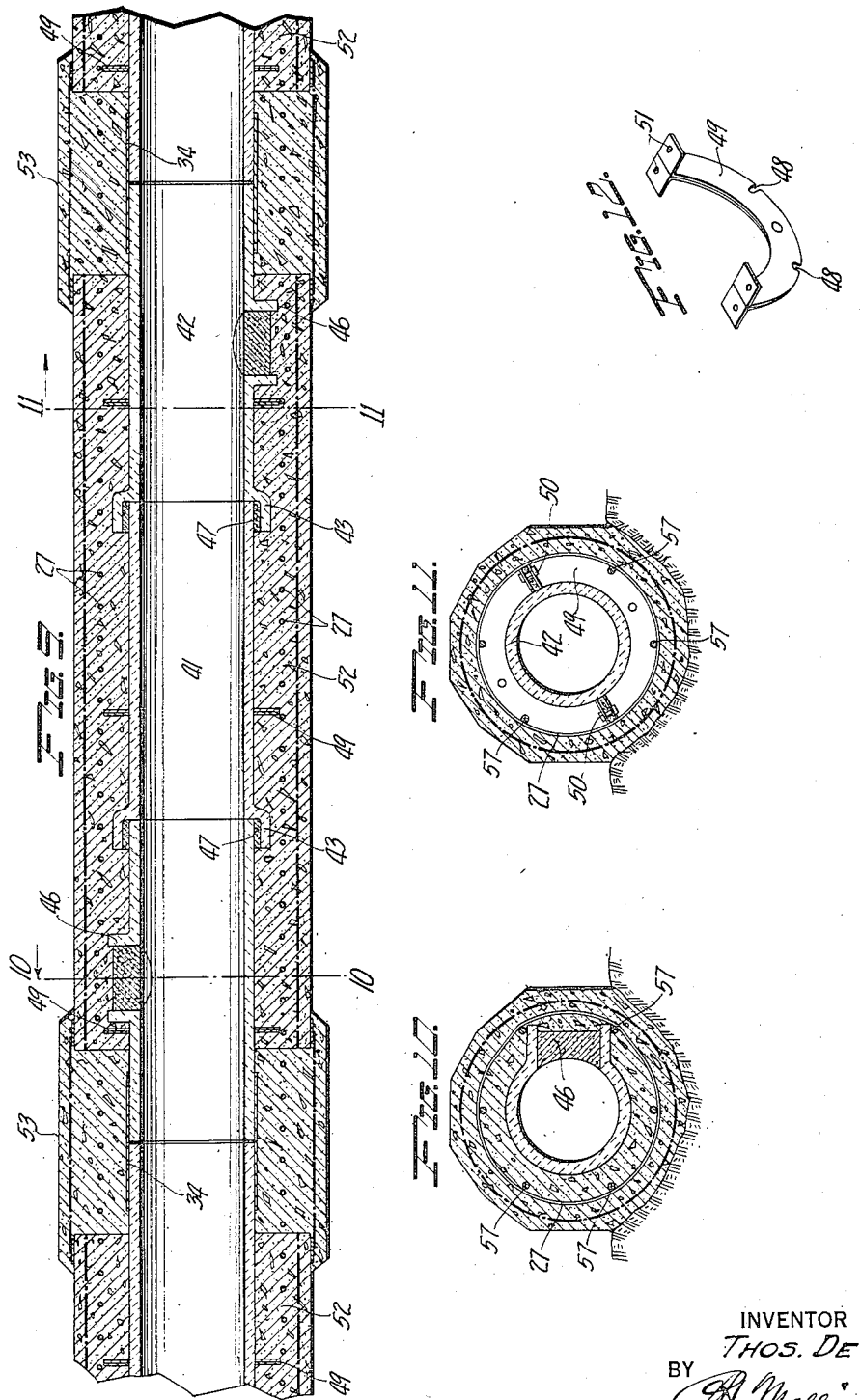

Patented July 30, 1929.

1,722,369

UNITED STATES PATENT OFFICE.

THOMAS DE LA MARE, OF SALT LAKE CITY, UTAH.

NONCORRODIBLE COMPOSITE PIPE.

Application filed February 20, 1928. Serial No. 255,676.

This invention relates to a non-corrodible composite pipe or conduit, and its principal objects are to provide:

First. A substantially indestructible pipe or conduit for use in transporting corrosive substances such as crude oil.

Second. A reinforced pipe having a hollow core or lining of non-corrodible material, such as vitrified clay or glass.

Third. A pipe which shall be cheap to manufacture and install.

I have found that vitrified clay pipe, commonly known as "sewer pipe" forms an excellent material for resisting the action of any corrosive fluid. Such pipe, however, is fragile and is not suited to withstand high pressures. Also, it is impracticable to make clay pipe in long lengths, thirty inches being the usual limit. This necessitates many joints, which, if made in the ordinary way, would be unfitted for severe conditions of use.

For convenience, my improved pipe is preferably made in lengths of about ten feet. Each length may be composed of a number of pieces of vitrified lining placed end to end and encased in a jacket of reinforced concrete. The joints between consecutive pieces of lining are made with elaterite or other noncorrodible plastic substance before the jacket is applied, and the shrinkage of the concrete serves to seat the pieces of lining snugly at the joints. The lining is allowed to protrude at both ends of each length about one foot. The contiguous protrusions of adjacent lengths are joined by means of a noncorrodible plastic substance such as elaterite, after which, the gap defined between the adjacent ends of the jackets is filled with concrete, reinforced to form a coupling between the consecutive jackets.

The features of the invention for which the protection of letters patent is desired, are collectively grouped in the claims concluding this specification.

In the drawings, which illustrate one form of my improved pipe,

Fig. 1 represents a longitudinal, vertical center section of a length;

Fig. 2, a longitudinal, vertical center section through a coupling, drawn to an enlarged scale;

Fig. 3, an enlargement of substantially the portion enclosed by broken line 3, in Fig. 2;

Fig. 4, a transverse section on line 4—4, Fig. 1;

Fig. 5, an end elevation on line 5—5, Fig. 1, preparatory to forming the coupling;

Fig. 6, a perspective of the coupling reinforcing;

Figs. 7 and 8, elevations drawn to a reduced scale in various stages of construction;

Fig. 9, a horizontal center section showing a modified construction;

Figs. 10 and 11, transverse sections on lines 10—10 and 11—11, respectively, Fig. 9 parts in the background omitted;

Fig. 12, a detail, in perspective.

Referring to the drawings, Figs. 1, 2, 4 and 5, the numeral 20 indicates pieces of vitrified pipe having plane ends and laid end to end with a slight space between consecutive pieces. These spaces are completely filled with plastic elaterite or other like noncorrodible substance, to form the joints between the individual pieces. Around each joint is a collar or sleeve 21 of sheet copper or other like material into which the individual pieces telescope, and on each sleeve are lugs 24 for supporting and spacing apart from each other, the longitudinally extending reinforcing bars 25. These bars may have their ends 25—1 bent into hook form for a purpose presently to be explained. Around the bars 25 is wrapped the spiral reinforcing material 27, and spaced apart, annularly therefrom, on the outside, is a wire mesh reinforcing material whose position is indicated by the broken lines 28.

The skeleton for each length of finished pipe is made up of a plurality of pieces 20, enclosed in a surrounding structure as just described.

If the soil, where the pipe is laid, is swampy, the individual lengths are built up on planks 29, but if on sandy soil, no planks are necessary. Removable collars 30 support each skeleton length before the concrete jacket is completed, and serve to form the end faces of the jacket when the concrete is placed.

The lengths may be built in consecutive order, one complete length being shown in Fig. 1, with the end portions of adjacent lengths indicated at 20—1 and 20—2. The form boards used in building are shown at 54.

In connecting the lengths to one another, the length joints between the vitrified linings are packed as indicated at 31 and 32. The metal sleeves 34 are then wrapped around the joints and bound with wires 35 as shown in Fig. 6, each sleeve 4 having the lugs 34—1 which are perforated to receive the reinforcing rods 36. The collars 30 are then removed and looped wires 56 are slipped over the ends 25—1 of the reinforcing rods, as indicated in Fig. 2, these wires being twisted together to form ties between the reinforcing rods of adjacent lengths of pipe. Strips 37 of sheet elaterite are placed around the ends of adjacent concrete jackets, after which the cylindrical wrapping of wire mesh reinforcing is placed as indicated by broken lines 38 in Fig. 2. The concrete jacket 40 completes the coupling. The coupling is prevented from cracking, in the curing and shrinking of the concrete, by the elaterite strips 37 which provide elastic and compressible seats for the inner ends of the coupling.

Fig. 7 shows a portion of a pipe line after the consecutive individual lengths are completed, but before the couplings are in place, while Fig. 8 shows a portion of the completed pipe line.

Where vitrified lining with bell ends is used, the separate pieces are placed together in the manner shown in Fig. 9, each complete length consisting of pieces, such as 41 and 42, with bell ends 43 and packing 47.

In order to provide for lateral service connections to the completed pipe lines, outlets 46 may be formed in any of the various lengths desired, these outlets facing alternately in opposite directions, to take care of laterals extending to either side of the pipe line. To avoid the outlets, part of the reinforcing rods 57 are supported in notches 48 defined in collars 49. Others of the reinforcing rods, rest in the spaces between the two halves of the collars 49, and may bear against the bolts 50, which pass through holes 51, these bolts being primarily for the purpose of holding the two collar halves together. The collars 49 may be spaced longitudinally along the pipe line, one collar to each length, as shown in Fig. 1.

The spiral wire reinforcing 27 may be wrapped around the rods 57, and the rods of the consecutive lengths 52 may be connected to each other by means of twisted wires similar to those shown in Fig. 2. The reinforced couplings 53 may be substantially similar to those shown at 40.

While a specific embodiment of my invention is herein shown and described, it is to be understood that various changes could be made therein without departing from the spirit and scope of the invention as defined in the claims.

Having fully described my invention, what I claim is:

1. A composite pipe consisting of individual lengths, each length comprising a plurality of lining sections set end to end, sleeves joining consecutive sections to one another, lugs projecting outwardly from said sleeves, longitudinal reinforcing rods supported by said lugs, a spiral reinforcing material extending around said rods substantially concentric with said lining sections, a wire mesh reinforcing material extending around said spiral material, and a jacket of concrete encasing said lining sections, all the said reinforcing rods and material being imbedded in said concrete jacket.

2. A composite pipe consisting of individual lengths, each length comprising non-corrodible lining sections set end to end, non-corrodible packing between consecutive lining sections, metallic sleeves joining consecutive sections to each other, lugs projecting outwardly from said sleeves, longitudinal reinforcing rods supported by said lugs, other reinforcing material around said rods substantially concentric with said lining sections, a concrete jacket around said lining sections, non-corrodible packing between said individual lengths, and concrete couplings joining the individual lengths to one another.

3. A composite length of pipe comprising a lining, a concrete jacket around said lining, said lining protruding longitudinally from said jacket; a second length of composite pipe similarly constructed, the protrusions of said composite lengths contiguous and in registry with each other; a packed joint between said pipes, a metallic sheet around said protrusions and covering said joint, lugs projecting from said metallic sheet, reinforcing bars carried by said lugs and a coupling of concrete extending from one to the other of the said jackets, said concrete coupling imbedding said metallic sheet and said rods.

4. A composite length of pipe comprising a lining, a concrete jacket around said lining, said lining protruding longitudinally from said jacket; a second composite length of pipe similarly constructed, the protrusions of said composite lengths adjacent and in registry with each other; a packed joint between said pipes, a metallic sheet around said protrusions and covering said joint, circumferentially spaced apart lugs projecting from said metallic sheet, reinforcing bars held by said lugs; a coupling of concrete extending from one to the other of the said jackets, said coupling overlapping said jackets and imbedding said metallic sheet and said rods, and bands of yielding material between the overlapping portions of said coupling and said pipes.

In testimony whereof I sign my name hereto.

THOMAS DE LA MARE.